(12) United States Patent
Shepherd et al.

(10) Patent No.: US 9,067,382 B2
(45) Date of Patent: Jun. 30, 2015

(54) THERMAL INSULATING STRUCTURES

(75) Inventors: Simon Harry Shepherd, Bristol (GB); Peter John Mellersh, Gloucester (GB)

(73) Assignee: Advanced Insulation PLC, Gloucester, Gloucestershire (GB)

( * ) Notice: Subject to any disclaimer, the term of this patent is extended or adjusted under 35 U.S.C. 154(b) by 0 days.

(21) Appl. No.: 12/598,028

(22) PCT Filed: Apr. 30, 2008

(86) PCT No.: PCT/GB2008/001498
§ 371 (c)(1),
(2), (4) Date: Nov. 19, 2009

(87) PCT Pub. No.: WO2008/135724
PCT Pub. Date: Nov. 13, 2008

(65) Prior Publication Data
US 2010/0129637 A1 May 27, 2010

(30) Foreign Application Priority Data

May 2, 2007 (GB) .................................. 0708471.8

(51) Int. Cl.
| B32B 5/18 | (2006.01) |
| B32B 27/06 | (2006.01) |
| B32B 7/12 | (2006.01) |
| B32B 27/42 | (2006.01) |

(52) U.S. Cl.
CPC ................ B32B 5/18 (2013.01); B32B 27/065 (2013.01); B32B 7/12 (2013.01); B32B 2262/106 (2013.01); B32B 2266/0285 (2013.01); B32B 2262/105 (2013.01); B32B 27/42 (2013.01); B32B 2262/101 (2013.01); B32B 2307/206 (2013.01); B32B 2307/536 (2013.01); B32B 2307/54 (2013.01); B32B 2307/542 (2013.01); B32B 2307/546 (2013.01)

(58) Field of Classification Search
USPC ................ 428/319.3, 319.7, 317.9, 314.4
See application file for complete search history.

(56) References Cited

U.S. PATENT DOCUMENTS

| 3,787,351 | A | * | 1/1974 | Olson ........................... 523/453 |
| 4,595,623 | A | * | 6/1986 | Du Pont et al. ................. 521/54 |
| 5,665,295 | A | * | 9/1997 | Takamoto et al. ........ 264/172.19 |
| 6,476,087 | B1 | * | 11/2002 | De Toffol ........................ 521/54 |
| 2004/0028877 | A1 | * | 2/2004 | Itoh et al. ...................... 428/118 |
| 2004/0059010 | A1 | * | 3/2004 | Nutt et al. ....................... 521/56 |
| 2004/0102534 | A1 | | 5/2004 | Orpin |
| 2006/0160914 | A1 | | 7/2006 | Orpin |
| 2007/0032575 | A1 | * | 2/2007 | Bulluck et al. ................ 523/219 |

FOREIGN PATENT DOCUMENTS

| EP | 0630956 A | 12/1994 |
| EP | 1264851 | 11/2002 |
| EP | 1420042 A | 5/2004 |
| GB | 2150495 A | 7/1985 |
| WO | WO9905447 A | 2/1999 |

OTHER PUBLICATIONS

Product Description of Troysol (TM) LAC from Troy Corporation, 2011, 1 pages.*
Jean-Francois Mazet, International Search Report for PCT/GB2008/001498, Jan. 21, 2009, Netherlands.

* cited by examiner

Primary Examiner — Hai Vo
(74) Attorney, Agent, or Firm — Chernoff, Vilhauer, McClung & Stenzel, LLP

(57) ABSTRACT

A subsea thermal insulating structure with a flexible inner tie coat which is the reaction product of a cold curing phenolic resin and a partial phosphate ester; a foam insulating layer which is the reaction produce of a cold cure phenolic syntactic resin and a partial phosphate ester; and an outer protective layer which is the reason product of a cold cure phenolic resin and a partial phosphate ester.

18 Claims, No Drawings

THERMAL INSULATING STRUCTURES

This is a national stage application filed under 35 USC 371 based on International Application No. PCT/GB2008/001498, filed Apr. 30, 2008, and claims priority under 35 USC 119 of United Kingdom Patent Application No. GB 0708471.8, filed May 2, 2007.

This invention concerns thermal insulating structures and a method of applying thermal insulating structures to a substrate, and particularly but not exclusively to thermal insulating structures for subsea use.

The application of thermal insulation to subsea oil and gas equipment is essential both for the technical feasibility and for the economic viability of a project, particularly in deep water and ultra deep water developments.

The benefits of thermal insulation are firstly a higher production rate by maintaining high oil temperature and increasing flow rates. Secondly lower processing costs by elimination of the requirement to reheat crude oil for water separation upon its arrival at the platform. Thirdly the prevention of hydrate and wax formation by maintaining the oil temperature above that at which hydrates form, in turn eliminating pipe blockages which would increase production costs. Fourthly, the elimination of the need for methanol injection to overcome the problems described above. Fifthly a reduction in the requirement for internal cleaning of pipes (known as pipe pigging). Accordingly, thermal insulation can make the difference between a project being viable or not.

Many systems exist for attempting to maintain the temperature of the extracted oil as it passes through those portions of the delivery pipework that are exposed to the cooling effects of sea water, to the recovery platforms or wellheads. Electrical heating elements may be attached to the pipework, the pipework may be surrounded by annular tubing that may or may not contain electrical heating elements or heat exchange tubes for pumped fluid heating. However, such arrangements are clearly expensive to install and cumbersome to maintain, whereas passive insulation systems rely only on maintaining the temperature of the extracted crude oil or gas by preventing heat loss.

Passive insulation is provided by many types of expanded solid but clearly the limitations and requirements for installation in a subsea environment limit the materials to those which can be rendered impermeable to the ingress of sea water, resistant both to the range of absolute temperatures experienced and the temperature differential across the insulation, while being sufficiently resilient to resist the flexural and impact stresses pertinent to installation, transport and service.

Items of subsea equipment which benefit from thermal insulation include, wellheads and Xmas trees, spool pieces, manifolds, risers and pipe field joints. Clearly any insulation material or system must be capable of being easily formed into complex shapes to accommodate the components of a pipe line assembly.

Syntactic foams are foams created by filling a resinous matrix with a particle that itself contains a closed void, such as a hollow sphere, such that the apparent specific gravity of the particulate material is significantly below the true specific gravity of the solid material from which the sphere is made. This property is then imparted to the resinous matrix in proportion to the volume occupied by the hollow particulate spheres. Spherical particles have a reinforcing effect, using the same mechanism as fibrous reinforcements. However spherical reinforcements provide isotropic properties, whereas fibrous or lamina reinforcements provide directional properties.

All proportions in this specification are expressed as weight percentages.

According to the present invention there is provided a thermal insulating structure for a substrate, the structure including a flexible inner tie coat which can bond to the substrate, the tie coat being the reaction product of a first material including a cold curing phenolic resin and a second material including a partial phosphate ester; a foam insulating layer which is the reaction product of a cold cure phenolic syntactic resin and a partial phosphate ester; and an outer protective layer which is the reaction product of a cold cure phenolic resin and a partial phosphate ester.

The tie coat, insulating layer and/or outer layer may include an amino functional silane coupling agent.

In the tie coat the first material may include 50-75 wt % phenolic resin, and desirably 65-70% phenolic resin. The phenolic resin may be a resol phenolic resin, and may have a water content of not greater than 16%.

The tie coat first material may include up to 2% ethanediol as a plasticiser.

The tie coat first material may include up to 2% of an anti cissing agent.

The tie coat first material may include between 0.5 and 2.5% of the silane coupling agent.

The tie coat first material may include between 1 and 4% fumed silica.

The tie coat first material may include between 15 and 30%, and desirably between 23 and 28%, cenospheres, and the cenosphere shells may be a mixture of any of zirconia, titania, alumina or ferric oxides.

The tie coat second material may include between 90 and 98% partial phosphate ester.

The tie coat second material may include up to 1% sulphonic acid as a cure accelerator.

The tie coat second material may include up to 10% water.

The ratio of first to second parts of the tie coat may be between 5:1 and 10:1.

The insulating layer first material may include between 35 and 75% phenolic resin, and desirably between 50 and 70%. The phenolic resin may be a resol phenolic resin, with a water content not greater than 16%.

The insulating layer first material may include up to 7% di ethyl phosphonate as a plasticizer, and desirably between 6 and 6.5%.

The insulating layer first material may include up to 2.5% of the silane coupling agent.

The insulating layer first material may include up to 5% glass strands, which glass strands are preferably between 3 and 12 mm long, and desirably between 5 and 7 mm long.

The insulating layer first material may include up to 5% zirconia fibre.

The insulating layer first material preferably includes between 15 and 30% glass cenospheres, and the cenospheres may have an SG of between 0.005 and 0.02.

The insulating layer first material may include up to 20% of a flexibliser, which may be a nitrile butadiene rubber.

The insulating layer second material may include up to 3% para toluene sulphonic acid as a curing accelerator. The insulating layer second material may include water.

The proportion of insulating layer first material to second material may be between 4:1 and 10:1.

The outer layer first material may include between 50 and 100% phenolic resin, and desirably between 63 and 69%. The phenolic resin may be a resol phenolic resin with a water content of not greater than 16%.

The outer layer first material may include up to 2.5% of a silane coupling agent.

The outer layer first material may include up to 1% ethanediol.

The outer layer first material may include approximately up to 4% fumed silica.

The ratio of first to second materials in the outer layer may be between 10:1 and 20:1.

Fibre reinforcement may be included in the outer layer, and the fibres may be of glass, Kevlar or carbon.

Embodiments of the present invention will now be described by way of example only.

EXAMPLE 1

A thermal insulating structure was made up of a tie coat, foam insulating layer and outer layer with the following constituents. First and second materials were formed, and mixed together in the following proportions.

| Tie Coat | |
|---|---|
| First Material | |
| Phenolic resin | 68.5% |
| Ethanediol | 0.7% |
| Anti cissing agent | 0.7% |
| Silane coupling agent | 0.7% |
| Dispersion Aid | 0.045 |
| Fumed Silica | 3.1% |
| Cenospheres | 26% |
| Second Material | |
| Partial phosphate ester | 94% |
| Para toluene sulphonic acid | 1% |
| Water | 5% |
| First Material:Second Material | 7:1 |

| Insulating Layer | |
|---|---|
| First Material | |
| Phenolic resin | 67.5% |
| Di ethyl ethyl phosphonate | 6.25% |
| Silane coupling agent | 0.75% |
| Dispersion aid | 3% |
| Chopped glass strands | 2.2% |
| Zirconia fibre | 1.8% |
| Glass cenospheres | 20.6% |
| Second Material | |
| Partial phosphate ester | 95% |
| Para toluene sulphonic acid | 5% |
| First Material:Second Material | 4.25:1 |

| Outer Layer | |
|---|---|
| First Material | |
| Phenolic resin | 97.1% |
| Silane coupling agent | 0.5% |
| Ethane diol | 0.8% |
| Fumed silica | 1.6% |
| Second Material | |
| Partial phosphate ester | 100% |
| First Material:Second Material | 12.5:1 |

The phenolic resin is a resol phenolic resin with a low viscosity and a water content of not greater than 16%.

The silane coupling agent is an amino functional silane coupling agent, typically represented by Dow Corning™ DC6137 a product of Dow Corning Corporation.

The chopped glass strands are typically between 3 and 12 mm long and optimally approximately 6 mm long.

The zirconia fibre is a fine ground fibre, typically represented by Enfil™ ceramic fibre a product of Thermal Ceramics.

The glass cenospheres are hollow glass expanded spheres with an SG of between 0.005 and 0.02, and optimally 0.01. Typically represented by Scotchlite™ K1, a product of 3M Speciality Materials.

The partial phosphate ester used in curing the top coat may be any partial phosphate ester selected for instance from Budit™ 380 a product of Chemishe Fabrik Budenheim, any of the Hordaphos™ range, products of Clariant GmbH, or optimally partial phosphate ester produced under EP1622965.

The anti cissing agent is Troysol LAC™ a product of the Troy Chemical Company.

The fumed silica is a thixotrope selected from any suitable supply, and is typically Cab-O-Sil™ TS 610 a product of the Cabot Corporation.

The cenospheres in the tie coat are high strength cenospheres in which the shell is a mixture of zirconia, titania, alumina and ferric oxides. An appropriate product would be Zeeospheres 200 from 3M.

A thermal insulating structure can be applied onto a substrate such as subsea equipment referred to above. The first and second materials of the tie coat are mixed together and pasted onto the substrate which will typically be prepared steel, to provide a layer probably 0.15 to 1 mm thick. This layer is left to green cure.

When ready, the first and second materials of the insulating layer are mixed together.

Air incorporated into the material during mixing is removed by consolidating the reaction mixture material 1 and 2 into malleable tiles of a pre-determined and controlled thickness in either a pneumatic press or vacuum table. These tiles are then applied on top of the green cured tie coat. Layers of up to 30 mm thick, and multiple layers, can be applied as required.

After approximately 48 hrs the outer layer is then formed on top of the insulating layer. The materials of the outer layer are mixed together and then laid onto appropriate fibre reinforcement which may be in the form of tape, and could be of glass, Kevlar, carbon or other materials. The outer layer would typically be 3 to 5 mm thick.

Provided below are properties obtained with such an insulating structure.

| | Insulation layer | Top Coat |
|---|---|---|
| Cured Density | 753 kg/m$^3$ | 1350 kg/m$^3$ |
| Applied Density | 700 kg/m$^3$ | |
| Thermal Conductivity (new) | 0.14 W/mK | 0.20 W/mK |
| Thermal Conductivity (aged) | 0.20 W/mK | 0.22 W/mK |

-continued

|  | Insulation layer | Top Coat |
|---|---|---|
| Specific Heat Capacity (new) | 2400 J/kgK | |
| Maximum service temperature | 200° C. | 200° C. |
| Maximum operating depth | 3000 msw | 3000 msw |
| Hardness | 65 Shore D | Barcol 75 |
| Tensile strength | 12.3 MPa/1785 psi | 61.6 MPa/8935 psi |
| Tensile modulus | 1718 MPa/249175 psi | 5660 MPa/820915 psi |
| Tensile strain to failure | 0.7% | 1.6% |
| Compressive strength | 27.3 MPa/3960 psi | |
| Triaxial compressive strength | >30 MPa/2690 psi | |
| Flexural strength | 18.5 MPa/2690 psi | 147 MPa/21320 psi |
| Flexural modulus | 1577 MPa/228725 psi | 5574 MPa/808440 psi |
| Shear strength (lap shear) | 0.9 MPa/130 psi | |
| Shear modulus | 16.3 MPa/2365 psi | |
| Shear bond between layers | 100% - Interlayer adhesion testing always fails in material | |
| Thermal expansion | $20.7 \times 10-6/°$ C. | |
| Poissons Ratio | 0.34 | |

SECOND EXAMPLE

A similar structure was formed in a similar manner but with an insulating layer with the following formulation.

| First Material | |
|---|---|
| Phenolic resin | 52% |
| Silane coupling agent | 1.8% |
| Chopped glass strands | 1.75% |
| Glass cenospheres | 26.5% |
| Flexibliser | 17.3% |

| Second Material | |
|---|---|
| Partial phosphate ester | 100% |
| First Material:Second Material | 7.14:1 |

The flexibliser is a nitrile butadiene rubber, typically represented by Nipol™ 1411, a product of Nippon Zeon Co.

In both examples partial phosphate esters act as curing agents to enhance the flexibility and ductility of the cured phenolic resin. This is an important feature in allowing the insulation structure to resist both mechanical flexure and thermal expansion of the pipework. This feature is enhanced by the presence in all three layers of the silane coupling agent, and the dispersion aids which serve to enhance the strength of matrix reinforcement interface. This property can be enhanced by the presence of plasticisers (di ethyl ethyl phosphonate, ethane diol) and also the flexibiliser which again enhances the ductility of the insulating layer.

The structures can be formed by cold curing, making them ideal for direct application at any stage of manufacture of equipment and pipework. The structures can be applied to finished and assembled structures on site in ambient conditions. The material does not experience shrinkage during curing, thereby enabling accurate thickness control during application. The application process ensures joins will become homogenous, thereby avoiding weak points in the system. The application process is relatively simple making modification and adjustment to insulation thickness coverage quick and simple.

Structures according to the invention were subjected to simulated service testing as follows:

The thermal conductivity of an insulating structure according to the invention was tested by conducting a full scale simulated service test on a section of 6" OD pipe insulated to a thickness of 94 mm (3.7") with the insulating structure. The test sample was immersed in a pressure container and exposed to service conditions (see below) for a period of 36 days at an internal fluid temperature of 148° C. and external sea water temperature 8° C. and a pressure of 175 bar. This gave an overall system thermal conductivity of 0.151 W/mK which is in agreement with the data shown in the above table derived from laboratory measurements.

The structure was also subjected to thermal shock and thermal cycling testing. The test pipe was a 300 mm (12") length of 2" duplex capped at one end and coated in the insulating structure to a thickness of 30 mm insulation foam plus 4 mm topcoat. This sample of the coated pipe was cycled between 15° and 190° for a total of 240 cycles in order to prove the stability and adhesion properties of the structure applied to primed steel work under normal cycling conditions in service. The cycle time measured was 180 minutes and the test was run continuously for 30 days. Following completion the test pipe was cut lengthways and crossways and the interfaces examined for breakdown. No disbondment was found between the layers and no cracking was found within the layers of either the insulation or the outer protective layer.

The system has also been subjected to tests to simulate the thermal shock effects of an LNG vessel blowdown and to investigate whether such conditions would impair the integrity of the structure. The test was conducted on a cylindrical vessel coated with thermally sprayed aluminium and the subsea system.

The test cylinder was filled with a water/glycol mixture and heated to 100° C. then rapidly drained and replaced with a water/glycol slurry at −30° which reduced the steel temperature to ambient within 3 to 4 minutes. The cylinder was again drained and filled with foam clay balls prechilled in liquid nitrogen and liquid nitrogen whereupon the temperature was measured at −185° C. After 5 minutes the liquid nitrogen was removed and the vessel left to warm up under ambient conditions until a temperature of −40° C. was reached whereupon water/glycol at 80° C. was poured into the vessel. Following completion of the test, samples were cut away and examined for breakdown. No disbondment or any other type of integrity failure was found.

A further test was carried out with a repair added to the structure to replicate a field joint or service repair. Again no disbondment or integrity failure was found illustrating both excellent bonding between the two materials and equivalent resistance to thermal shock.

In addition to the test described above, further tests were undertaken to examine the degradation effects of thermal cycling. Samples of the insulation structure on steel substrates have been subjected to cycling from 120° C. to −20° C. for thirty cycles each involving instant transition between the temperature extremes. Cycling from 90° C. to −20° C. for thirty cycles under full immersion in seawater at ambient pressure with a cool down/heat up time of approximately 2 hours.

There was no effect on the bonding to the steel substrate from either thermal regime. The effects on the water saturated and unsaturated samples were indistinguishable.

In addition the insulation structure has been further evaluated with respect to thermal shock. A 6" OD pipe sample was coated with the structure. The pipe section was subjected to thermal shock by introducing hot oil at 121° C. to the inside of the pipe as rapidly as possible with the hot oil then allowed to cool. The external temperature was 4° C. and the pressure was ambient. The test was repeated for five cycles. After each cycle the test sample was visually examined for signs of cracking and disbondment. Upon completion of the testing programme the test sample was cut into sections and examined for signs of cracks, disbondment and delamination. No cracking, delamination or disbondment were found in the test sample either between any of the layers or the substrate.

Full scale bend testing has been undertaken on a 12.2 meter length of 6" OD pipe coated with 60 mm foam thickness of the insulation structure. At the centre section of the test sample a field joint was installed to test whether this would provide a weakened section. The pipe was bent to develop 0.27% strain on the outer surface of the steel pipe for a 5 cycle duration. The strain rate used was rapid in that the bend was taken from its straight position to the full bend in a period of 3 seconds. The test temperature was 4° C. which was achieved by chilling the sample and applying extra insulation to maintain the temperature.

After the test the sample was inspected for signs of cracking delamination and disbondment. No cracking, delamination of disbondment was found in the test sample either between the layers or the substrate.

The insulation structure has been subjected to fatigue testing involving up to 1000 cycles at >75% of the anticipated failure load in flexural tests. The final strength and modulus of the system were reduced by approximately 10% during the first load cycle; subsequent cycles did not decrease the failure load or modulus. This performance is comparable with truly elastic systems and offers an improvement on polyurethane and polyisocyanate or GRP based systems.

The shear and compressive strengths of the structure has been assessed at −20° C., ambient and at temperatures up to 160° C. Repeat loadings (>140 cycles) of the system to 75% of the anticipated shear failure load has been conducted at ambient and elevated temperature. These tests have shown the structure is unaffected by repeat loading and confirm the fatigue test results for flexural loading.

Evaluation was also conducted in a dual cantilever mode with target bending strain at 0.4% in dual cantilever bending on samples of the structure system. A thermal scan showed three phase transitions at −60° C., −10° C. and 60° C. Testing was completed at between −5° C. and 4° C. which meant modulus and damping changed with temperature but necessary to keep the maximum temperature below 4° C. Starting at −5° C. ensured the heat up rate was manageable with temperature cooled through the addition of liquid nitrogen. The tests were run at 3 Hz which for 5000 cycles equates to 27.8 minutes.

All tests were run for 30 minute minimum. At the end of each test the samples were inspected under an optical microscope and the surfaces 25 scanned at 10× magnification to look for micro cracks. The mean temperatures for the three individual tests were −2° C., −4° C. and −4° C. All tests were run at 0.4% strain (+3/−1%). The tests were completed successfully with no reported cracking in the material.

The impact resistance properties of the insulation structure when bonded to a section of steel pipe have been evaluated. A 10" OD carbon steel pipe sample was coated with the structure. The test was designed to reflect realistic in-service damage. The impact was reproduced by rolling the pipe off supports at 3.66 mm elevation. The impact surface was reinforced concrete. The pipe was dropped three times and the damage assessed after each drop. The pipe weight of 3,329.5N resulted in an impact energy of 12,186 J.

The surface of the insulation structure showed a few scuffs after the third drop. There were also a few small localised punctures in the composite top coat caused by gravel on the surface of the concrete. There was no disbondment of the structure from the steel. The steel pipe showed extensive damage where it had impacted, thus demonstrating that the insulation structure has sufficient impact resistance to withstand the rigours of fabrication and handling process and the associated risks.

There is thus described a thermal insulating structure, and a method of applying such a structure which provides a number of advantages. As indicated above enhanced performance is achieved, whilst a structure can readily be applied in a wide range of conditions.

Various other modifications may be made without departing from the scope of the invention. For instance, different materials or different proportions of materials may be used.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. In combination with a substrate for use subsea, a thermal insulating structure applied to the substrate and for use subsea, the thermal insulating structure including comprising:
a flexible inner tie coat which is bonded to the substrate, the tie coat consisting of the reaction product of a first material and a second material, the first material consisting of respective amounts of a cold curing phenolic resin and an anti cissing agent, and respective amounts of materials selected from the group consisting of a plasticizer, a silane coupling agent, fumed silica, cenospheres, water, and a dispersion aid, and the second material consisting of a partial phosphate ester and respective amounts of materials selected from the group consisting of a cure accelerator and water; a foam insulating layer which is the reaction product of a first material including a cold cure phenolic syntactic resin and a second material including a partial phosphate ester and which insulating layer includes between 15 and 30% by weight cenospheres and a nitrile butadiene rubber flexibilizer up to a maximum of 20% by weight; and an outer protective layer which is the reaction product of a first material including a cold cure phenolic resin and a second material including a partial phosphate ester, the outer protective layer having a greater thickness than the inner tie coat layer.

2. The combination according to claim 1, in which the tie coat, insulating layer and/or outer layer each includes between 0.5 and 2.5% by weight of an amino functional silane coupling agent.

3. The combination according to claim 1, in which in the tie coat the first material includes 50-75% by weight phenolic resin.

4. The combination according to claim 1, in which the phenolic resin of the tie coat first material is a resol phenolic resin, has a water content of not greater than 16% by weight, and/or includes up to 2% by weight ethanediol as a plasticiser.

5. The combination according to claim 1, in which the tie coat first material includes between 1 and 4% by weight fumed silica, and includes between 15 and 30% by weight cenospheres.

6. The combination according to claim 1, in which the cenospheres have a specific gravity of between 0.005 and 0.02.

7. The combination according to claim 1, in which the tie coat second material includes: between 90 and 98% by weight partial phosphate ester; up to 1% by weight sulphonic acid as a cure accelerator; and/or up to 10% by weight water.

8. The combination according to claim 1, in which the ratio of first to second materials of the tie coat is between 5:1 and 10:1.

9. The combination according to claim 1, in which the proportion of first material to second material of the insulating layer is between 4:1 and 10:1.

10. The combination according to claim 1, in which the ratio of first material to second material of the outer layer is between 10:1 and 20:1.

11. The combination according to claim 1, in which the insulating layer first material includes between 35 and 75% by weight phenolic resin; in which the phenolic resin of the insulating layer first material is a resol phenolic resin; and/or has a water content not greater than 16% by weight.

12. The combination according to claim 1, in which the insulating layer first material includes up to 7% by weight di ethyl phosphonate as a plasticizer.

13. The combination according to or claim 1, in which the insulating layer first material includes: up to 2.5% by weight of the silane coupling agent;
includes up to 5% by weight glass strands between 3 and 12 mm long; and includes up to 5% by weight zirconia fibre.

14. The combination according to claim 1, in which the insulating layer second material includes up to 3% by weight para toluene sulphonic acid as a curing accelerator, and includes water.

15. The combination according to claim 1, in which: the outer layer first material includes between 50 and 100% by weight of the phenolic resin; the phenolic resin of the outer layer first material is a resol phenolic resin; the phenolic resin of the outer layer first material has a water content of not greater than 16% by weight; the outer layer first material includes up to 2.5% by weight of a silane coupling agent; the outer layer first material includes up to 1% by weight ethanediol; and/or the outer layer first material includes up to 4% by weight fumed silica.

16. The combination according to claim 1, in which fibre reinforcement is included in the outer layer, and the fibres are of glass or carbon.

17. The combination according to claim 1, in which the inner tie coat layer is 0.15 to 1 mm thick.

18. The combination according to claim 1, in which the outer protective layer is 3 to 5 mm thick.

* * * * *